May 25, 1937.　　　A. HOLLANDER　　　2,081,454
ADJUSTABLE SHAFT MOTOR
Filed July 1, 1936　　　2 Sheets-Sheet 2

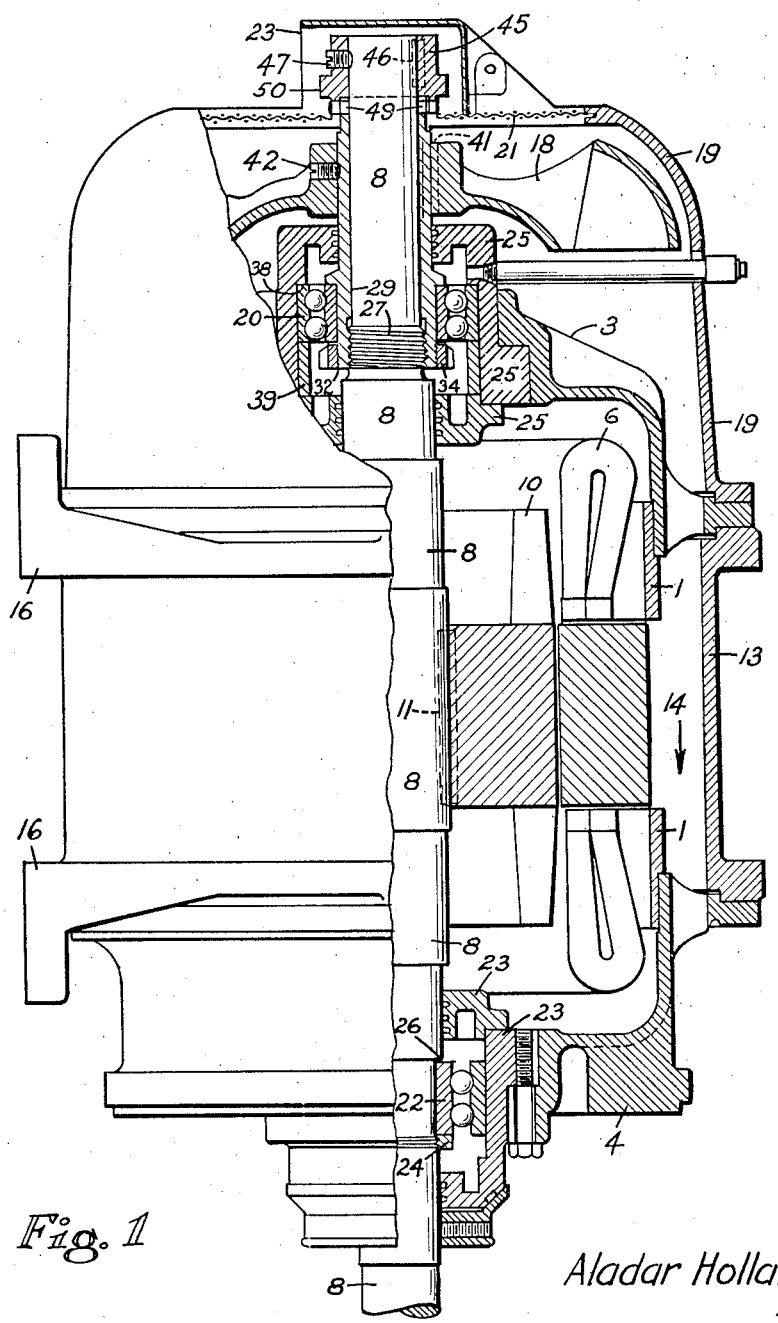

*Aladar Hollander*
INVENTOR.
BY *John D. Chesnut*
ATTORNEYS.

Patented May 25, 1937

2,081,454

UNITED STATES PATENT OFFICE 2,081,454

ADJUSTABLE SHAFT MOTOR

Aladar Hollander, Berkeley, Calif., assignor to Byron Jackson Co., Huntington Park, Calif., a corporation of Delaware Application July 1, 1936, Serial No. 88,401

3 Claims. (Cl. 172—36)

This invention relates to means for making axial shaft adjustments in electric motors. The invention is intended particularly for use with totally enclosed, fan cooled, horizontal motors such as are used for directly driving open-impeller centrifugal pumps.

An open impeller centrifugal pump requires occasional axial adjustment of the impeller with respect to the casing in order to maintain a close clearance between same. Inasmuch as the impeller is usually rigidly attached to the pump shaft and the motor shaft is rigidly attached to the pump shaft it is necessary to move the motor shaft axially in order to adjust the impeller. If the motor is totally enclosed and is fan cooled, the shaft must be adjusted from the outer end and without disturbing the position of the fan and the bearings on the shaft.

It is the object of the present invention to provide a shaft construction for totally enclosed, fan cooled motors such that the shaft can be adjusted axially from the outer end of the motor without disturbing the location of the bearings or fan on the shaft.

Another object is to provide a motor shaft with an axially adjustable sleeve on which the bearings and fan are positioned, there being a threaded connection between the shaft and sleeve whereby the shaft can be adjusted axially without disturbing the position of the sleeve.

Figure 1 is an elevation, partly in cross-section taken through the horizontal axis of a motor embodying the preferred form of my invention.

Figure 3:
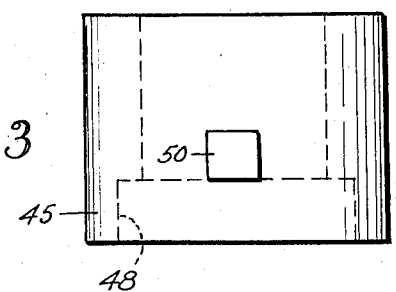
Figure 3 is a side elevation of the locking ring.
Figure 4:
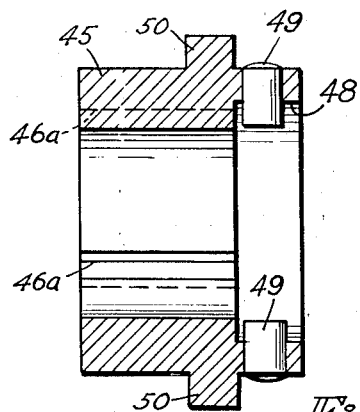
Figure 4 is a cross section of the locking ring taken on line 4—4 of Figure 2.
Figure 2:
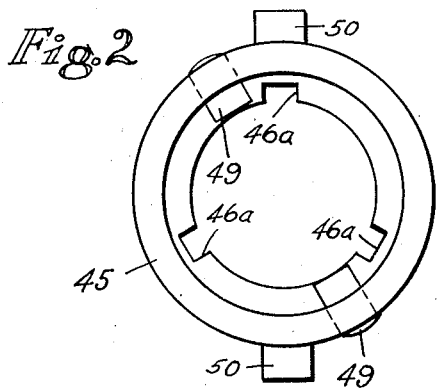
Figure 2 is an end view of the locking ring.
Figure 5:
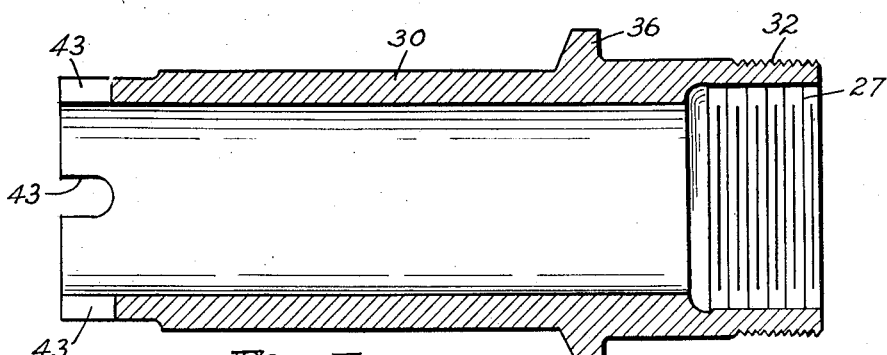
Figure 5 is an axial cross section of the adjusting sleeve.

A typical motor housing is shown at 1, provided with end covers 3 and 4. The motor stator is indicated at 6 in the housing. The motor shaft 8 extends through the housing and end covers and carries the rotor 10, keyed to the shaft as indicated at 11. Enclosing the motor housing 1 is a second housing 13, spaced from housing 1 to form an air circulating passage 14. The outer housing 13 is provided with a suitable supporting base member 16. An air circulating fan 18 is mounted on the motor shaft beyond the end cover 3. A cover 19 encloses the fan and is secured to the cover 3. The outer end of fan housing 19 is provided with an air suction inlet protected by a screen 21. The end of the motor shaft extends through the screen 21 and is protected by a hinged cover 23 attached to the fan cover 19.

The motor bearings are shown at 20 and 22 supported in the end covers 3 and 4. The bearing 22 is a plain radial bearing and is enclosed in a typical grease retaining cartridge 23 the details of which need not be described here except to note that the inner race is secured to the shaft 8 by means of the nut 24 which holds the race against the shoulder 26 on the shaft, so that the shaft and bearing move axially as a unit for a limited distance. The other ball race 20 is a combination radial and thrust bearing and is supported in a ball-bearing cartridge 25 of typical design.

My improved shaft-adjusting means will now be described.

The fan end of shaft is reduced in diameter and threaded as shown at 27. The shaft diameter is again reduced beyond the threads 27 as indicated at 29. A sleeve 30 is mounted on the reduced portion 29 of the shaft 8. The sleeve fits snugly around the shaft and has an outside diameter equal to the original shaft diameter through the bearing 20. The sleeve 30 is counterbored and threaded internally at one end to engage the threads 27 on the shaft. The sleeve end is also threaded externally as shown at 32 to receive a lock nut 34 which holds the inner race of the bearing 20 against a shoulder 36 formed on the exterior of the sleeve 30 so that the sleeve must rotate with the lower race. The ball race 20 is secured in the cartridge 25 by the shoulder 38 and the spacer ring 39 both of which engage the outer race. Thus when the sleeve 30 is inserted in the cartridge 25 and the lock nut 34 is tightened the sleeve 30 can not move axially with respect to the bearing 20 and must be rotated with the shaft 8. The fan 18 is secured to the sleeve 30 by any suitable means such as the key 41 and set screw 42.

The shaft 8 is adjusted axially through the sleeve 30 by rotating the shaft while holding the sleeve. For this purpose (and also for locking the sleeve in place after the shaft has been axially adjusted) the sleeve 30 is provided at its outer end with a series of notches 43, there being four such notches in the present instance, arranged 90 degrees apart around the sleeve. A lock ring 45 fits around the end of shaft 8 beyond the sleeve 30. The lock ring 45 is secured against rotation relative to the shaft 8 by means of a key 46, and is secured against axial movement with respect to the shaft by means of a set screw 47. The shaft is provided with three key seats 46a arranged around the circumference of the shaft. The inner end of the lock ring 45 is counterbored as indicated at 48 to slip over the end of the sleeve 30 and is provided with a pair of diametrically disposed studs 49 adapted to engage the notches 43 in the end of the sleeve 30. The outer side of the lock ring 45 is provided with a pair of diametrically disposed lugs 50 adapted to be engaged by a wrench.

The method of making the axial shaft adjustment and the locking of the sleeve to the shaft after the adjustment has been made is obvious from the foregoing description, it being necessary only to disengage the lock ring 45 from the sleeve 30 and turn the sleeve relative to the shaft 8 so that the shaft moves along the sleeve threads 27. Thus the shaft 8 can be adjusted axially without disturbing the position of the fan 18 or the bearing cartridges 23 and 25 and without removing the end cover 19 or otherwise dismantling the motor.

Although I have shown the radial bearing 22 secured to the shaft 8 and being slidable in the bearing cartridge 23 I can make the shaft 8 slidable through the inner bearing race and secure the outer race in the bearing cartridge.

The foregoing description illustrates the preferred embodiment of my invention. The details of construction may be varied within the scope of the appended claims.

I claim:

1. In a totally enclosed fan-cooled electric motor, a housing enclosing the motor and fan, a motor shaft supported adjacent its ends by ball race bearings, including bearing housings supported in the motor housing at opposite ends thereof, and having one end of the shaft extending beyond the motor and fan housing, a sleeve mounted on the extended end of said motor shaft and having a threaded connection therewith, said sleeve extending through the adjacent motor bearing and secured to the inner bearing race, said bearing being secured in the motor housing against axial movement, a fan mounted on said sleeve for rotation therewith, and means at the end of said shaft and sleeve for securing same against respective rotation, said shaft being slidable through the opposite motor bearing housing.

2. In a totally enclosed fan-cooled electric motor, a housing enclosing the motor and fan, a motor shaft supported adjacent its ends by ball race bearings, including bearing housings supported in the motor housing at opposite ends thereof, and having one end of the shaft extending beyond the motor and fan housing, the extended end of said shaft being of reduced diameter and provided with a threaded portion, a sleeve rotatably mounted on said extended portion of the shaft and having threaded engagement therewith, said sleeve extending through the adjacent motor bearing and having an external shoulder intermediate its ends adapted to engage one side of the inner race way of said bearing, the inner end portion of said sleeve being threaded externally, a lock nut on said threaded sleeve adapted to secure said inner race way against said shoulder, said bearing being secured in the motor housing against axial movement, the fan being secured to said sleeve for rotation therewith, and means co-acting between the extended end of said shaft and sleeve for causing or preventing relative rotation thereof, said shaft being slidable through the opposite motor bearing housing.

3. In a totally enclosed fan-cooled electric motor, a housing enclosing the motor and fan, a motor shaft supported adjacent its ends by ball race bearings, including bearing housings supported in the motor housing at opposite ends thereof, and having one end of the shaft extending beyond the motor and fan housing, a sleeve mounted on the extended end of said shaft in threaded connection therewith, said sleeve extending through said bearing and being secured to the inner race against movement with respect thereto, said bearing being secured in the motor housing against movement with respect thereto, a fan mounted on said sleeve for rotation therewith, notches formed in the outer end of said sleeve, a lock ring mounted on the end of said shaft and having projections engaging the notches in said sleeve, and means for securing said lock ring to said shaft to prevent movement with respect thereto, said shaft being slidable through the opposite motor bearing housing.

ALADAR HOLLANDER.